United States Patent [19]

Nakai et al.

[11] Patent Number: 5,041,966

[45] Date of Patent: Aug. 20, 1991

[54] PARTIALLY DISTRIBUTED METHOD FOR CLOCK SYNCHRONIZATION

[75] Inventors: Syoichiro Nakai; Satoshi Hasegawa, both of Tokyo, Japan

[73] Assignee: NEC Corporation, Tokyo, Japan

[21] Appl. No.: 253,478

[22] Filed: Oct. 5, 1988

[30] Foreign Application Priority Data

Oct. 6, 1987 [JP] Japan .................................. 62-252787
Oct. 28, 1987 [JP] Japan .................................. 62-273817
Apr. 21, 1988 [JP] Japan .................................... 63-99937

[51] Int. Cl.$^5$ .............................................. G06F 1/04
[52] U.S. Cl. .................................. 364/200; 364/228.7; 364/228.8; 364/271.0; 364/271.2
[58] Field of Search ... 364/200 MS File, 900 MS File

[56] References Cited

U.S. PATENT DOCUMENTS 4,503,490  3/1985  Thompson ................................. 364/200
4,531,185  7/1985  Halpern et al. ........................... 364/200
4,680,779  7/1987  Wakerly .................................... 370/103

OTHER PUBLICATIONS

Gusella et al., "An Election Algorithm for a Distributed Clock Synchronization Program", Proceedings of 6th International Conf. of IEEE on Distributed Computing Systems (May 1986), pp. 364-371.

Cristian et al., "Clock Synchronization in the Presence of Omission and Performance Faults, and Processor Joins", Proceedings of 16th International Symposium of IEEE on Fault-Tolerant Computing (1986), pp. 218-223.

Lamport et al., "Synchronizing Clocks in the Presence of Faults", Journal of the Association of Computing Machinery, vol. 32, No. 1 (Jan. 1985), pp. 55-78.

Primary Examiner—David Y. Eng
Attorney, Agent, or Firm—Foley & Lardner

[57] ABSTRACT

In a distributed system comprising a plurality of processors coupled to one another, each processor comprises a controllable clock circuit which indicates a local time. Clock synchronization methods are based on the idea in which randomly selected M processors out of the total N processors cooperate to adjust the controllable clock circuits of all processors in the distributed system. Three types of methods are described. In a first one of the methods, all processors randomly selects M processors, respectively, at time instants which are different from one another, and each processor adjusts its own controllable clock circuit to an average of the local times of the selected M processors. In a second method, each processor transmits its own local time to randomly selected M processors and adjusts its own controllable clock circuit to the average of received local times. In a third method, all processors adjust their controllable clock circuits to the average of received local times issued by randomly selected M processors. Fault tolerance against each processor is taken into account in their methods. Their methods can be applied to a sufficient large distributed system because of a small number of messages exchanged among processors.

8 Claims, 14 Drawing Sheets

PARTIALLY DISTRIBUTED METHOD FOR CLOCK SYNCHRONIZATION

BACKGROUND OF THE INVENTION

This invention relates to a method of synchronizing a plurality of controllable clock circuits for use in a loosely coupled distributed system comprising a plurality of processors which are included in the controllable clock circuits, respectively, and which are coupled to one another.

A loosely coupled distributed system is, for example, one of multiprocessor systems that comprises a plurality of processors having no common memory. Such a multiprocessor system may be a distributed filing system, a communication network system, and so on. The distributed filing system comprises the processors, each of which creates or compiles a plurality of files. Each processor includes a controllable clock circuit indicating a local time and a local memory, such as a magnetic disk. Each file is memorized in its own local memory together with the local time at a creating or a compiling time instant at which the file is created or compiled. Each file is assigned with a version or an operation condition. The version of the file is often identified by using the creating or the compiling time instant of the file. In this case, the controllable clock circuits of all processors must indicate local times which are equal to one another as a system time instant for the distributed filing system.

Inasmuch as each processor, for example, successively memorizes its own history information itself in its local memory together with the system time instant, it is possible to obtain information for assisting in locating a failure from the history information when the failure occurs.

The communication network system comprises a plurality of nodes as the processors are connected to one another through transmission paths. Also in the communication network system, the controllable clock circuits of all processors must indicate the local times which are equal to one another as a network time instant for the communication network system. This is necessary because, for example, a service may be offered at a predetermined reservation time instant by connecting the transmission paths together.

Various clock synchronization methods are already known. By way of example, a clock synchronization method is disclosed in an article which is contributed by Riccardo Gusella et al to Proceedings of the 6th International Conference of IEEE on Distributed Computing Systems (May 1986), pages 364–371, under the title of "An Election Algorithm for a Distributed Clock Synchronization Program". The clock synchronization method according to the Gusella et al article is designed for a distributed network clock synchronizer for Berkeley UNIX 4.3BSD computer systems which is called TEMPO. The TEMPO works in a local area network where a specific one of the processors is called a master processor and the remaining processors are each called a slave processor. The master processor inquires of all processors about local times indicated by controllable clock circuits of the respective processors with a predetermined time interval and then computes the network time instant as an average of the local times. The master processor issues an instruction for clock adjustment that includes the network time instant. Each processor adjusts its own controllable clock circuit by using the instruction issued from the master processor. Therefore, a clock synchronization method by the TEMPO is called a master-slave method. In the master-slave method, one processor must become a new master processor when a failure happens to a previous master processor. According to the Gusella et al article, an election algorithm or method using a time-out scheme is implemented. A first one of the slave processors, whose timer circuit expires after the failure has occurred in the previous master processor, becomes a candidate for the new master processor. The candidate broadcasts an election message to all processors notifying them of its candidacy and the new master processor is elected among such slave processors. At any rate, inasmuch as the master processor inquires of all processors about the local times, traffic for the master processor is increased and the overhead in the master processor is increased in order to compute the average of the local times when there are a large number of processors.

Another clock synchronization method is described in an article which is contributed by Flaviu Cristian et al to Proceedings of 16th Annual International Symposium of IEEE on Fault-Tolerant Computing (1986), pages 218–223, under the title of "Clock Synchronization in the Presence of Omission and Performance Faults, and Processor Joins". In the clock synchronization method according to the Cristian et al article, each processor in the communication network system diffuses periodically a message for establishing synchronization that includes its own local time. Each processor adjusts its own controllable clock circuit by using the message which includes the fastest local time. The controllable clock circuits of all processors therefore indicate the fastest local time as the network time instant when clock synchronization is maintained. As a result, the network time instant is controlled by a specific processor having the controllable clock circuit which indicates the fastest local time. Therefore, the specific processor corresponds to the master processor which is described in the Gusella et al article. When the controllable clock circuits of the respective processors indicate local times which are nearly equal to one another, the messages for establishing synchronization are almost simultaneously transmitted from the processors. In this case, processing for synchronizing the controllable clock circuits is repeatedly and concentratedly carried out at a particular time instant.

Still another example is disclosed in an article which is contributed by Leslie Lamport et al to Journal of the Association of Computing Machinery, Vol. 32, No. 1 (January 1985), pages 55–78, under the title of "Synchronizing Clocks in the Presence of Faults". In the clock synchronization method according to the Lamport et al article, all processors in the system periodically transmit the local times indicated by the controllable clock circuits of the respective processors to one another. Each processor controls its own controllable clock circuit by using the transmitted time instants and its own local time. The clock synchronization method according to the Lamport et al article is therefore called a fully distributed algorithm or method. The fully distributed method focuses on fault tolerance against even malicious failures. However, the fully distributed method is disadvantageous in that communication overhead increases in a practical large system. This is because all processors mutually communicate.

In order to remove the disadvantages discussed above, a clock synchronization method has been proposed by Syoichiro Nakai et al, the present joint inventors, in a paper read in "A Symposium on Integrity and Reliability for Information Communication Network" under the auspices of "Denshi Joho Tushin Gakkai (The Institute of Electronics, Information and Communication Engineers of Japan)" (July 1987), pages 35-38, under the title of "A Study on Clock Synchronization in Network Systems" according to contributors' translation. In the clock synchronization method described in the Nakai et al paper, each of the processors randomly and periodically selects a plurality of processors as selected processors from all processors equal in number to a first predetermined number which is not less than three. The selected processors are equal in number to a second predetermined number which is not less than two but is less than the first predetermined number. Each processor reads, as read time instants, the local times indicated by the controllable clock circuits of the respective selected processors and then controls its own controllable clock circuit by using its own local time and the read time instants. When each processor reads the local times from the respective selected processors, each processor transmits to the respective selected processors inquiry messages for obtaining from the respective selected processors the local times indicated by the controllable clock circuits of the respective selected processors and then receives from the respective selected processors acknowledgement messages including the local times indicated by the controllable clock circuits of the respective selected processors. However, transmission of the inquiry messages transmitted from all processors are repeatedly and concentratedly carried out at a predetermined time instant at which clock synchronization is maintained, that is, at which the controllable clock circuits of all processors indicate the local times which are nearly equal to one another. This is because all processors transmit the inquiry messages to the respective selected processors at the predetermined time instant. In addition, each processor waits for the acknowledgement messages transmitted from the respective selected processors. When any one of the selected processor develops a fault and becomes a fault processor and when the fault processor therefore can not transmit the acknowledgement message to the processor waiting for the acknowledgement message which the fault processor should transmit, the processor waits for the acknowledgement message and falls into a deadlock condition.

SUMMARY OF THE INVENTION

It is an object of this invention to provide a distributed system and a method of synchronizing a plurality of controllable clock circuits, wherein inquiry messages are not concentratedly transmitted at a predetermined time instant.

It is another object of this invention to provide a distributed system and a method of synchronizing a plurality of controllable clock circuits, wherein all processors avoid a deadlock condition even if any processor develops a fault.

It is still another object of this invention to provide a distributed system and a method of synchronizing a plurality of controllable clock circuits, wherein it is possible to synchronize the controllable clock circuits without the transmission of any inquiry message.

A situation to which this invention is applicable is for synchronizing first through N-th controllable clock circuits included in first through N-th processors, respectively, where N represents a first predetermined natural number which is not less than three. An n-th controllable clock circuit indicates an n-th local time, where n represents each of 1 through N. An n-th processor controls the n-th controllable clock circuit by using the n-th local time and remaining local times indicated by the first through the N-th controllable clock circuits, except for the n-th controllable clock circuits.

According to a first aspect of this invention, the above-mentioned method comprises the steps of setting in an n-th timer circuit of the n-th processor an adjusting time interval which is randomly selected as a predetermined time interval when the n-th controllable clock indicates a predetermined time instant, of randomly selecting a plurality of processors as selected processors from the first through said N-th processors when the adjusting time interval lapses in the n-th timer circuit from a time instant at which the adjusting time interval is set in the n-th timer circuit, where the selected processors are equal in number to a second predetermined natural number which is not less than two but is less than the first predetermined natural number, of reading, as read time instants, the local times indicated by the controllable clock circuits of the respective selected processors, and of controlling the n-th controllable clock circuit by using the n-th local time and the read time instants.

According to a second aspect of this invention, the above-mentioned method comprises the steps of randomly selecting a plurality of processors as selected processors from the first through the N-th processors whenever the n-th controllable clock circuit repeatedly indicates a predetermined time instant, the selected processors being equal in number to a second predetermined natural number which is not less than two but is less than the first predetermined natural number, and of transmitting the n-th local time to the selected processors as a transmitted time.

According to a third aspect of this invention, the above-mentioned method comprises the steps of generating a random variable which has a particular one of a plurality of predetermined logic values at a time with a predetermined probability, of selecting the random variable with a predetermined period as a selected variable, and of transmitting the n-th local time to the first through the N-th processors as a transmitted time when the n-th controllable clock circuit indicates a predetermined time instant and when the selected variable has the particular one of the predetermined logic values.

A distributed system to which this invention is applicable comprises first through N-th processors coupled to one another where N represents a first predetermined natural number which is not less than three, the first through the N-th processors includes first through N-th controllable clock circuits, respectively. An n-th controllable clock circuit indicates an n-th local time, where n represents each of 1 through N. An n-th processor controls the n-th controllable clock circuit by using the n-th local time and remaining local times indicated by the first through the N-th controllable clock circuits, except for the n-th controllable clock circuit.

In the distributed system according to a first aspect of this invention, the n-th processor comprises generating means for generating an adjusting time interval which is randomly selected as a predetermined time interval when the n-th controllable clock indicates a predetermined time instant, measuring means responsive to the adjusting time interval for measuring a lapsed time after the predetermined time instant, the measuring means producing a time out signal when the lapsed time is equal to the adjusting time interval, selecting means responsive to the time out signal for randomly selecting a plurality of processors as selected processors from the first through the N-th processors, the selected processors being equal in number to a second predetermined natural number which is not less than two but which is less than the first predetermined natural number, reading means for reading, as read time instants, the local times indicated by the controllable clock circuits of the respective selected processors, and controlling means for controlling the n-th controllable clock circuit by using the n-th local time and the read time instants.

In the distributed system according to a second aspect of this invention, the n-th processor comprises a selecting means for randomly selecting a plurality of processors as selected processors from the first through the N-th processors whenever the n-th controllable clock circuits repeatedly indicate a predetermined time instant, the selected processors being equal in number to a second predetermined natural number which is not less than two but is less than the first predetermined natural number, and transmitting means for transmitting the n-th local time to the selected processors as a transmitted time.

In the distributed system according to a third aspect of this invention, the n-th processor comprises generating means for generating a random variable which has a particular one of a plurality of predetermined logic values at a time with a predetermined probability, selecting means for selecting the random variable with a predetermined period as a selected variable, and transmitting means for transmitting the n-th local time to the first through the N-th processors as a transmitted time when the n-th controllable clock circuit indicates a predetermined time instant and furthermore when the selected variable has the particular one of the predetermined logic values.

DESCRIPTION OF THE PREFERRED EMBODIMENTS

Figure 1:
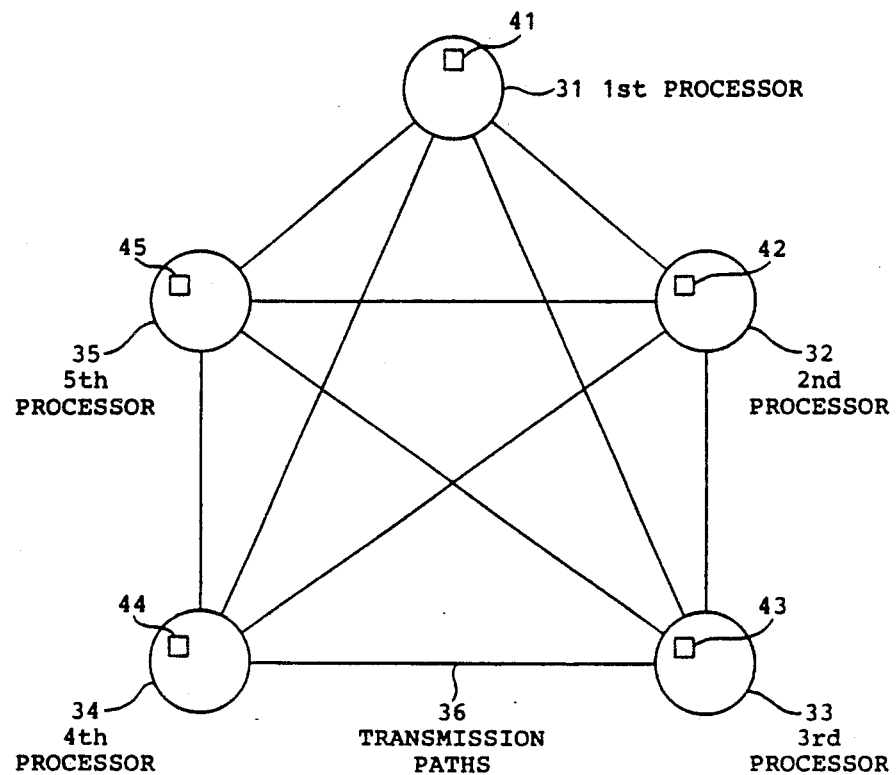
FIG. 1 shows a block diagram for use in describing a loosely coupled distributed system according to a first embodiment of this invention.

Referring to FIG. 1, description will begin with a loosely coupled distributed system according to a first embodiment of the present invention. As will become clear as the description proceeds, the description is common to other embodiments of this invention. The loosely coupled distributed system comprises first through N-th processors loosely coupled to one another where N represents a first predetermined natural number which is not less than three. In the illustrated example, the first predetermined natural number N is equal to five. The first through the fifth processors are depicted at 31, 32, 33, 34, and 35. The first through the fifth processors 31 to 35 are connected to one another through transmission paths 36. The first through the fifth processors 31 to 35 include first through fifth controllable clock circuits 41, 42, 43, 44, and 45, respectively. An n-th controllable clock circuit $4n$ indicates and n-th local time Cn, where n represents each of 1 through 5. An n-th processor $3n$ controls the n-th controllable clock circuit $4n$ by using the n-th local time Cn and remaining local times indicated by the first through the fifth controllable clock circuit 41 to 45 except for the n-th controllable clock circuit $4n$ in a manner to later be described.

In a little more detail, the loosely coupled distributed system is implemented in accordance with first through third embodiments of this invention. At first, the first embodiments will be described. The second and the third embodiments will be described later in the following.

For a loosely coupled distributed system according to the first embodiments, the n-th processor $3n$ includes an n-th timer circuit (later illustrated). The n-th processor $3n$, at first, sets in the n-th timer circuit an adjusting time interval which is randomly selected from a predetermined time interval when the n-th controllable clock circuit indicates a predetermined time instant. The adjusting and the predetermined time intervals and the predetermined time instant will presently be exemplified.

Next, the n-th processor 3n randomly selects a plurality of processors as selected processors from the first through the fifth processors 31 to 35 when the adjusting time interval lapses in the n-th timer circuit from a time instant at which the adjusting time interval is set in the n-th timer circuit. The selected processors are equal in number to a second predetermined natural number M which is not less than two but is less than the first predetermined natural number N. The n-th processor reads, as read time instants, the local times indicated by the controllable clock circuits of the respective selected processors, and then controls the n-th controllable clock circuits by using the n-th local time and the read time instants.

Figure 2:
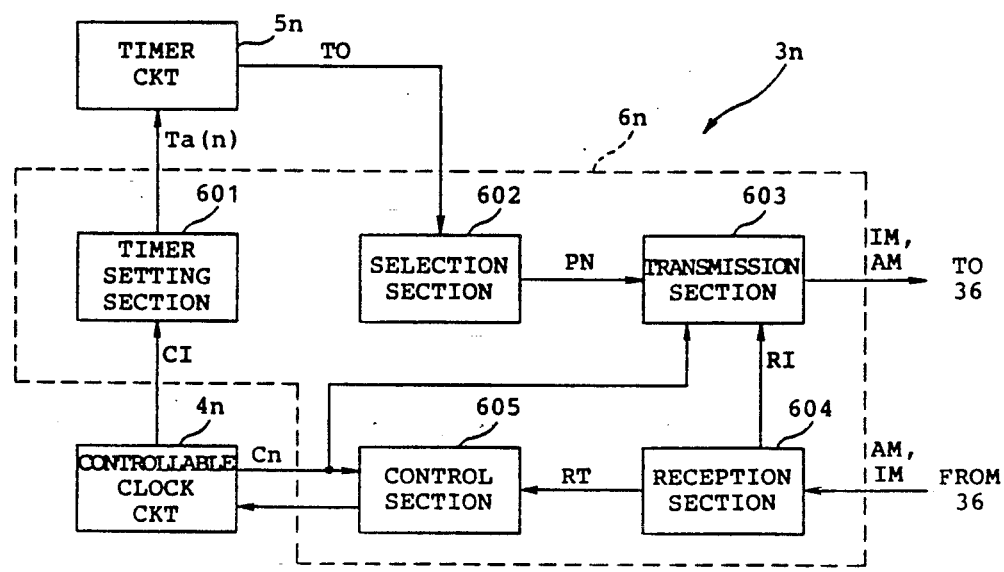
FIG. 2 shows a block diagram of a processor for use in the loosely coupled distributed system according to the first embodiment of this invention.

Referring to FIG. 2, the n-th processor 3n is assigned with an n-th processor number representative of the n-th processor 3n. The n-th processor 3n comprises the n-th timer circuit depicted at 5n. The n-th controllable clock circuit 4n produces a clock interruption signal CI when the n-th controllable clock circuit 4n indicates the predetermined time instant which will be denoted by tnp. The predetermined time instant tnp is, for example, one o'clock in the afternoon. The clock interruption signal CI is supplied to an n-th processing unit 6n. The n-th processing unit 6n comprises a timer setting section 601. Responsive to the clock interruption signal CI, the timer setting section 601 sets in the n-th timer circuit 5n an adjusting time interval Ta(n) which is randomly selected from the predetermined time interval, now denoted by Tp. The adjusting time interval Ta(n) is so denoted because it may differ from one processor to another processor. For example, the adjusting time interval Ta(1) may be zero minutes long. The adjusting time interval Ta(2) may be ten minutes long. The predetermined time interval Tp is, for example, ten minutes long. The timer setting section 601 therefore acts as a generating arrangement for generating the adjusting time interval Ta(n) when the n-th controllable clock circuit 5n indicates the predetermined time instant tnp.

Responsive to the adjusting time interval Ta(n), the n-th timer circuit 5n acts as a measuring arrangement for measuring a lapsed time after the predetermined time instant tnp. The n-th timer circuit 5n produces a time out signal TO when the lapsed time becomes equal to the adjusting time interval Ta(n). The time out signal TO is supplied to the n-th processing unit 6n. The n-th processing unit 6n comprises a selection section 602. Responsive to the time out signal TO, the selection section 602 randomly selects a plurality of processors as selected processors from the first through the fifth processors 31 to 35. The selected processors are equal in number to the second predetermined natural number M. In the illustrated example, the second predetermined natural number M may be three. The selection section 602 produces the processor numbers which represent the respective selected processors as selected processor numbers PN. The selected processor numbers PN are supplied to a transmission section 603. Responsive to the selected processor numbers PN, the transmission section 603 transmits inquiry messages IM to the respective selected processors through the transmission paths 36. The inquiry messages IM are messages for obtaining from the respective selected processors the local times indicated by the controllable clock circuits of the respective selected processors.

It will be assumed that an i-th processor 3i is one of the selected processors, where i represents one of 1 through 5. An i-th processing unit 6i of the i-th processor 3i comprises a reception section 604 depicted in the n-th processor 3n merely for convenience of illustration. The reception section 604 produces a reception interruption signal RI when the reception section 604 receives the inquiry message IM. The reception interruption signal RI is supplied to the transmission section 603 of the i-th processing unit 3i. Responsive to the reception interruption signal RI, the transmission section 603 transmits an acknowledgement message AM to the n-th processor 3n from which the inquiry message IM is received. The acknowledgement message AM includes the i-th local time Ci through the transmission paths 36.

In the n-th processing unit 6n, the reception section 604 receives the acknowledgement messages from the respective selected processors. The reception section 604 produces the local times included in the acknowledgement messages as read time instants RT. The transmission section 603 and the reception section 604 collectively act as a reading arrangement for reading, as the read time instants RT, the local times indicated by the controllable clock circuits of the respective selected processors. The read time instants RT are supplied to a control section 605 of the n-th processing unit 6n. The control section 605 controls the n-th controllable clock circuit 4n by using the n-th local time Cn and the read time instants RT.

Figure 3:
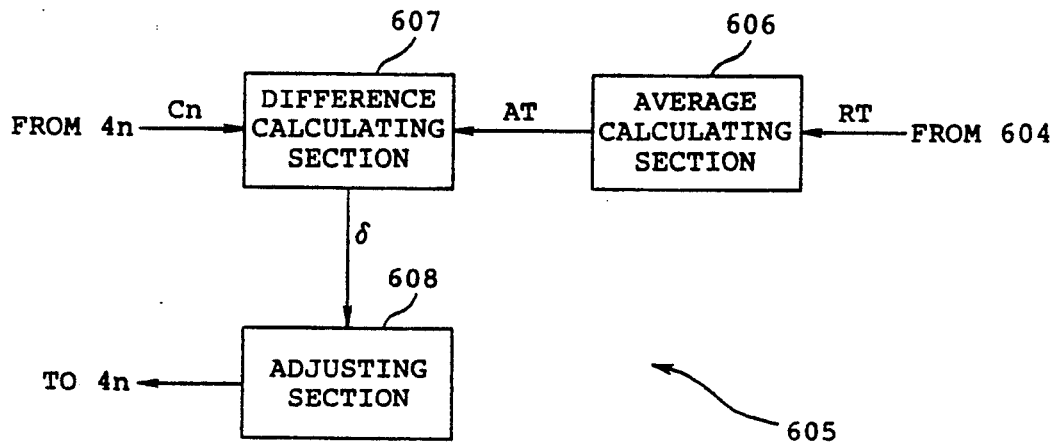
FIG. 3 shows a block diagram of a control section for use in the processor illustrated in FIG. 2.

Referring to FIG. 3, the control section 605 comprises an average calculating section 606 for calculating an average time instant AT of the read time instants RT. A difference calculating section 605 calculates the time difference $\delta$ between the n-th local time Cn and the average time instant AT. An adjusting section 608 adjusts the n-th controllable clock circuit 4n by using the time difference $\delta$.

Figure 4:
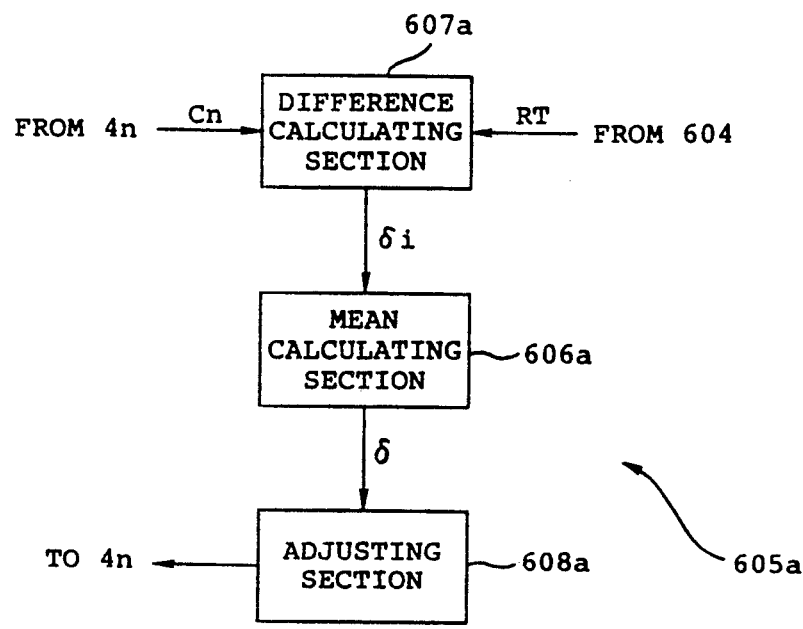
FIG. 4 shows a block diagram of another control section for use in the processor illustrated in FIG. 2.

Referring to FIG. 4, the control section 605 of FIG. 3 is modified into a modified control section 605a as will later become clear. The control section 605a comprises the difference calculating section, indicated at 607a for calculating time differences $\delta i$ between the n-th local time Cn and the read time instants RT. A mean calculating section 606a calculates a mean time $\delta$ of the time differences $\delta i$. An adjusting section 608a adjusts the n-th controllable clock circuit 4n by using the mean time $\delta$.

The inquiry message IM of the n-th processor 3n may include the n-th local time Cn. In this case, the acknowledgement message AM of the i-th processor 3i does not include i-th local time Ci. Instead, the acknowledgement message AM includes information related to the time difference $\delta i$ calculated between the n-th local time Cn and the i-th local time Ci by the difference calculating section 607a.

Figure 5:
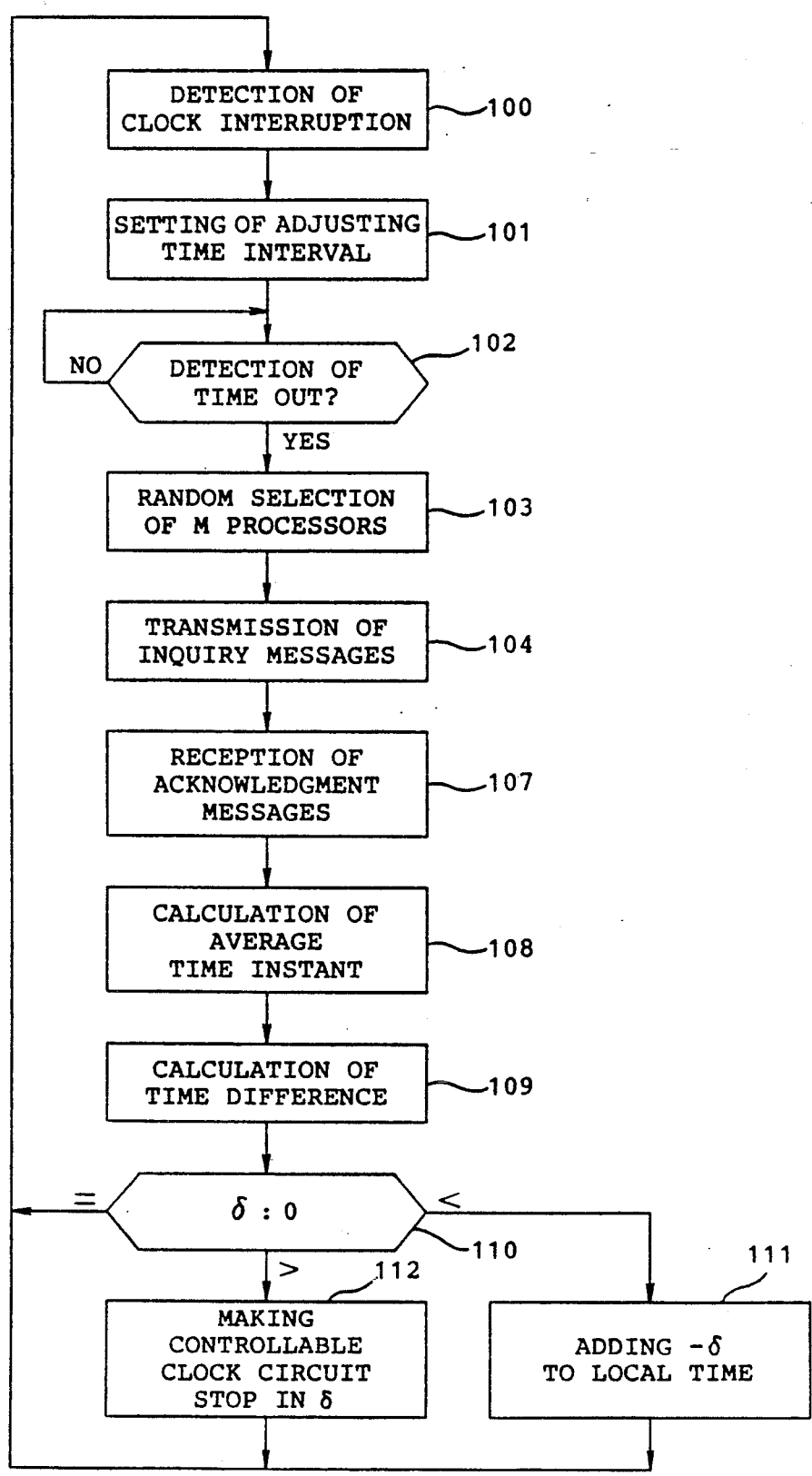
FIG. 5 shows a flow chart for use in describing operation of the loosely coupled distributed system according to the first embodiment.
Figure 6:
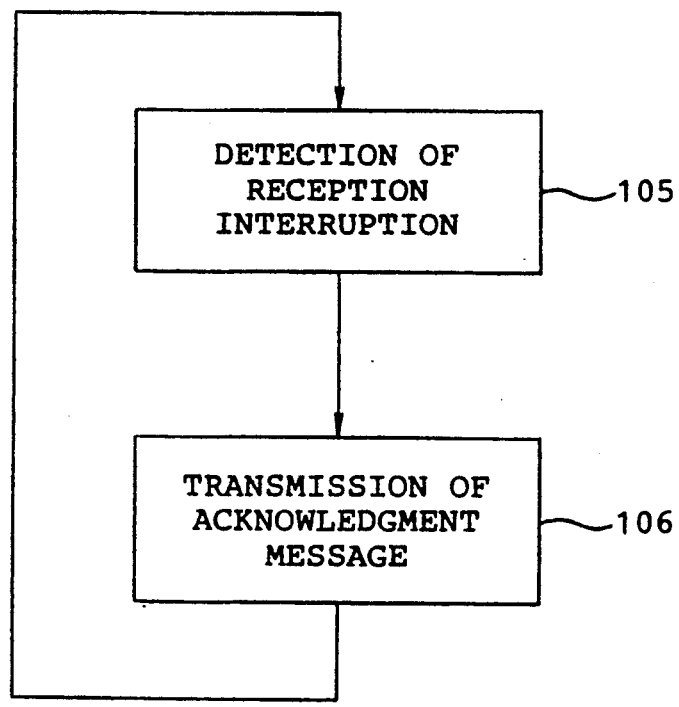
FIG. 6 shows a flow chart for use in describing another operation of the loosely coupled distributed system according to the first embodiment.

Referring to FIGS. 5 and 6, the description will proceed to operation of the n-th processor 3n of FIG. 2 and the i-th processor 3i.

When the timer setting section 601 detects the clock interruption signal CI produced by the n-th controllable clock circuit 4n (a step 100 in FIG. 5), the timer setting section 601 sets in the n-th timer circuit 5n the adjusting time interval Ta(n) (step 101 in FIG. 5). The selection section 602 waits for the time out signal TO delivered from the n-th timer circuit 5n (step 102 in FIG. 5). Responsive to the time out signal TO, the selection section 602 randomly selects a plurality of processors as the selected processors from the first through the fifth processors 31 to 35 (step 103 in FIG. 5). The selection section 602 delivers the selected processor numbers PN representative of the respective selected processors.

Responsive to the selected processor numbers PN, the transmission section 603 transmits the inquiry messages IM to the respective selected processors through the transmission paths 36 (step 104 in FIG. 5).

In each of the selected processors 3i, the reception section 604 of each selected processor 3i produces the reception interrruption signal RI when the reception section 605 receives the inquiry signal RI (step 105 in FIG. 6). Responsive to the reception interruption signal RI, the transmission section 603 of each selected processor 3i produces the acknowledgement message AM including the i-th local time Ci to the n-th processor 3n through the transmission paths 36 (step 106 in FIG. 6).

Turning back to FIG. 5, the reception section 604 extracts the local times included in the acknowledgement messages as read time instants RT when the reception section 604 receives the acknowledgement messages from the respective selected processors 3i (step 107). Responsive to the read time instants RT and the n-th local time Cn, the control section 605 controls the n-th controllable clock circuit 4n by the n-th local time Cn and the read time instants RT (steps 108 to 112).

More specifically, the average calculating section 606 calculates the average time instant AT of the read time instants RT (step 108). The difference calculating section 607 subtracts the average time instant AT from the n-th local time Cn to produce the time difference δ (step 109). The adjusting section 508 adjusts the n-th controllable clock circuit 4n by using the time difference δ (steps 110 to 112). At first, the adjusting section 608 compares the time difference δ with zero (step 110). When the time difference δ is equal to zero, step 110 proceeds to step 100. When the time difference δ is negative, the adjusting section 608 adjusts the n-th controllable clock circuit 4n by adding the n-th local time Cn to an absolute value of the time difference δ (step 111). When the time difference δ is positive, the adjusting section 608 adjusts the n-th controllable clock circuit 4n by making the n-th controllable clock circuit 4n stop for the time difference δ (step 112).

In the communication network system, there are transmission delays between the processors.

Figure 7:
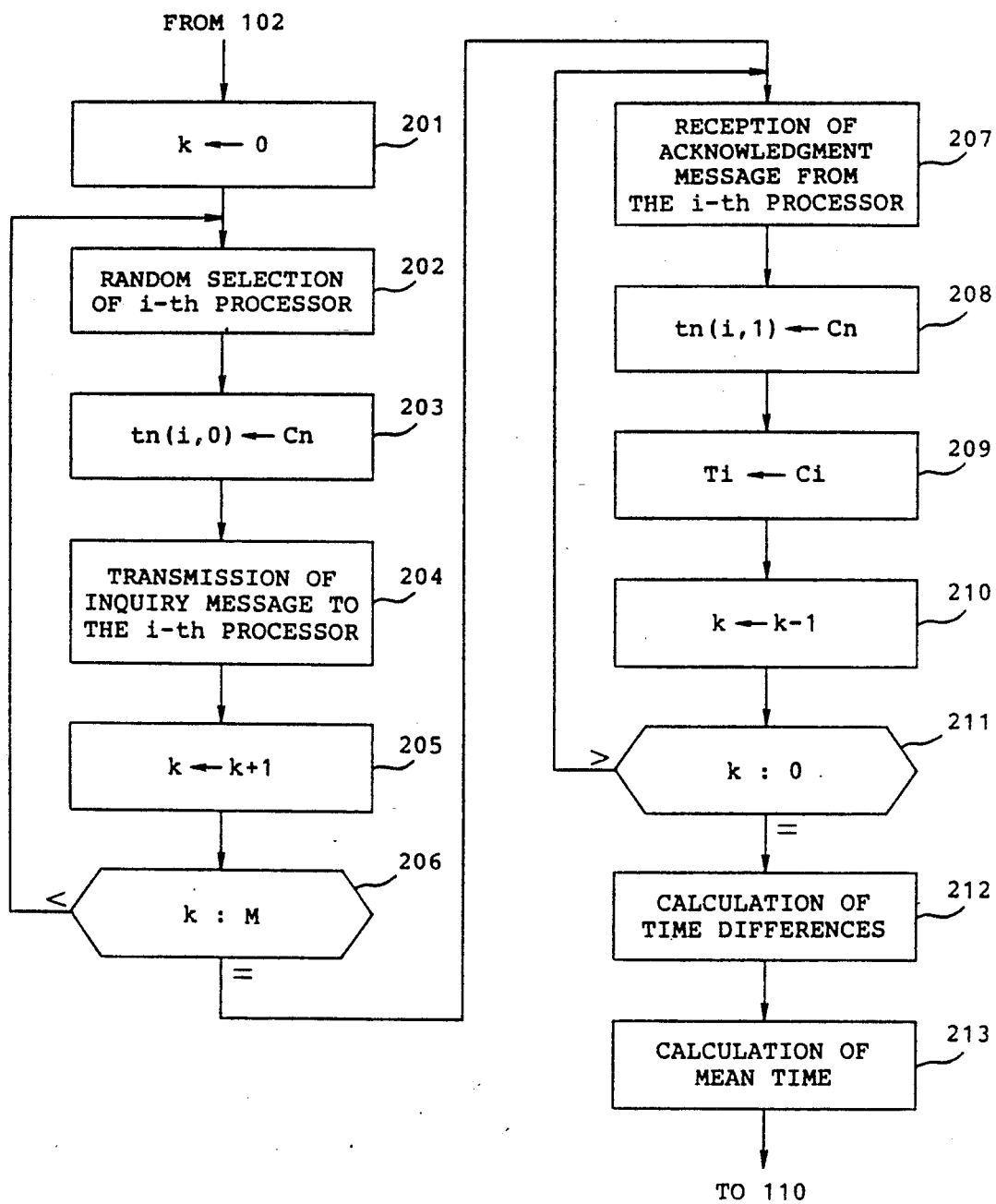
FIG. 7 shows a flow chart for use in specifically describing operation of a part of the flow chart as shown in FIG. 5.

Referring to FIG. 7, description will be made as regards another clock synchronization method which considers the transmission delays. This method corresponds to steps 103, 104, 107, 108, and 109 described in conjunction with FIG. 5.

A step 201 in FIG. 7 follows step 102 in FIG. 5. The n-th processing unit 6n puts zero as a first variable k for counting the number of the selected processors at step 201. The n-th processing unit 6n randomly selects a processor from the first through the n-th processors 31 to 35 as a selected processor 3i, as shown at step 202 in FIG. 7. The n-th processing unit 6n substitutes a second variable tn(i,0) for the n-th local time Cn, as shown at step 203 in FIG. 7. The n-th processing unit 6n transmits the inquiry message to the selected processor 3i through the transmission paths 36, as shown at step 204 in FIG. 7. The n-th processing unit 6n adds one to the first variable k, as shown at step 205 in FIG. 7. The n-th processing unit 6n compares the first variable k with the second predetermined natural number M, as shown at step 206 in FIG. 7. When the first variable k is less than the second predetermined natural number M, step 206 returns to step 202. When the first variable k is equal to the second predetermined natural number M, step 206 proceeds to step 207 in FIG. 7.

The n-th processing unit 6n receives the acknowledgement message from the selected processor 3i at step 207. The n-th processing unit 6n substitutes a third variable tn(i,1) for the n-th local time Cn, as shown at step 208 in FIG. 7. The n-th processing unit 6n substitutes a fourth variable Ti for the i-th local time Ci included in the acknowledgement message AM, as shown at step 209 in FIG. 7. The n-th processing unit 6n subtracts one from the first variable k, as shown at step 210 in FIG. 7. The n-th processing unit 6n compares the first variable k with zero, as shown at step 211 in FIG. 7. When the first variable k is greater than zero, step 211 returns to step 207. When the first variable k is equal to zero, step 211 proceeds to step 212.

The n-th processing unit 6n may not receive the acknowledgement messages AM from all selected processors due to a missing acknowledgement message, inquiry message or the like. In this case, the n-th processing unit 6n may forcibly proceed from step 211 to step 212 at a time instant which is a predetermined time interval after the predetermined time instant tnp even though the first variable k is not equal to zero.

It will be assumed that the inquiry message is transmitted from the n-th processor 3n to the i-th processor 3i with a transmission delay which is nearly equal to another transmission delay of the acknowledgement message transmitted from the i-th processor 3i to the n-th processor 3n.

In step 212, the n-th processing unit 6n predicts at first, as a predicted time instant Cpi, the i-th local time Ci at which the n-th controllable clock circuit 4n indicates a time instant equal to the second variable tn(i,0) and then calculates the time difference δi between the second variable tn(i,0) and the predicted time instant Cpi by using the second variable tn(i,0), the third variable tn(i,1), and the fourth variable Ti. That is, the predicted time instant Cpi is given by an equation:

$$Cpi = Ti - (tn(i,1) - tn(i,0))/2. \tag{1}$$

Therefore, the time difference δi, which is equal to a time difference between the n-th local time Cn and the n-th local time Ci, is given by:

$$\delta i = tn(i,0) - Cpi;$$

namely:

$$\delta i = tn(i,0) - \{Ti - (tn(i,1) - tn(i,0))/2\}. \tag{2}$$

In step 212, a plurality of time differences δi are calculated. The time differences δi are equal in number to the second predetermined natural number M. The n-th processing unit 6n calculates a mean time δ of the time differences δi, as shown at step 213 in FIG. 7. Step 213 is followed by step 110 in FIG. 5. Inasmuch as the above-mentioned method predicts the predicted time instant Cpi in consideration of the transmission delays between the processors, it is possible to remove the harmful influence of the transmission delays.

For a loosely coupled distributed system according to the second embodiment, the n-th processor 3n includes an n-th local memory (later illustrated). The n-th processor 3n randomly selects at first a plurality of processors as selected processors from the first through the fifth processors 31 to 35 whenever the n-th controllable clock circuit repeatedly indicates a predetermined time instant, and then transmits the n-th local time to the selected processors as a transmitted time. The n-th processor 3n calculates time differences between the n-th local time and the respective transmitted times whenever the transmitted time is repeatedly received, and then stores the time differences in the n-th local memory as stored times. Thus, the n-th local memory memorizes the time differences. The n-th processor 3n calculates a mean time of the memorized times when the n-th controllable clock circuit 4n indicates a time instant which is a predetermined time interval after the predetermined time instant, and then adjusts the n-th controllable clock circuit 4n by using the mean time. The predetermined time interval is selected in consideration of synchronization errors between processors, a processing time for each processor, and transmission times of the transmitted time. The predetermined time interval may, for example, be equal to thirty minutes.

Figure 8:
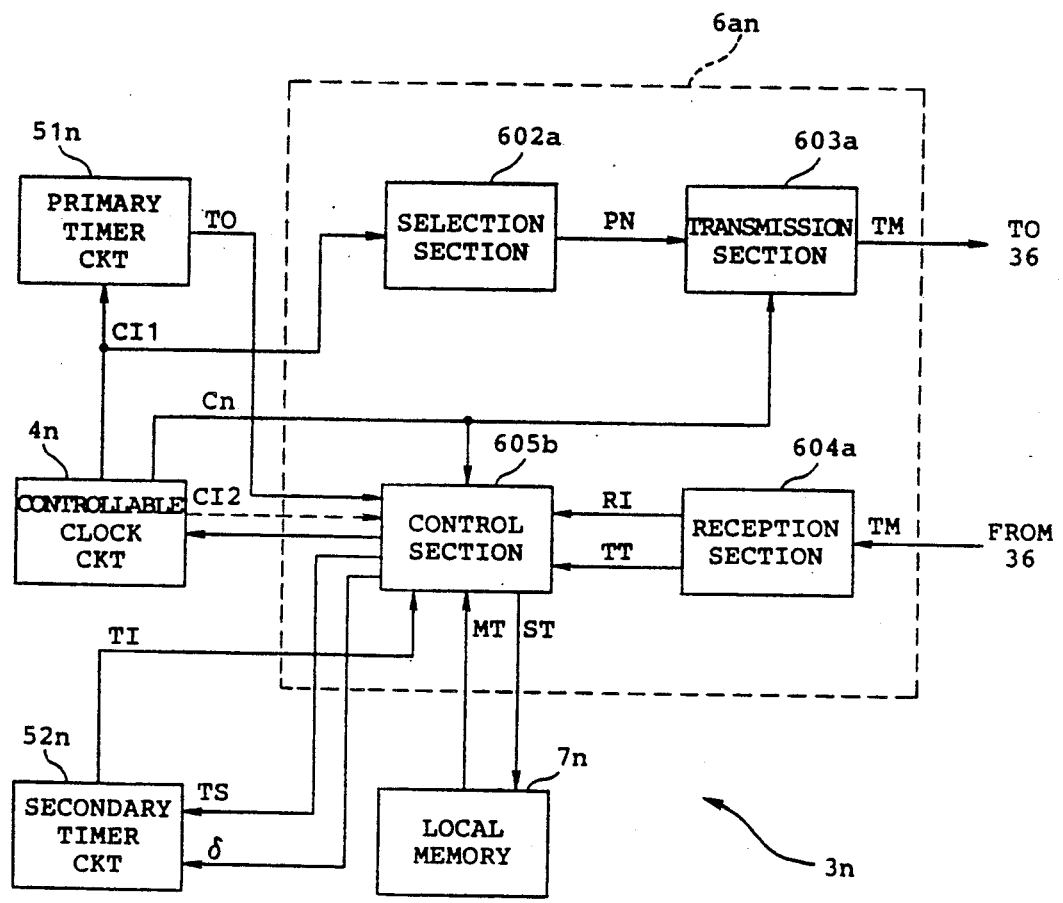
FIG. 8 shows a block diagram of a processor for use in a loosely coupled distributed system according to a second embodiment of this invention.

Referring to FIG. 8, the n-th processor 3n comprises the n-th local memory depicted at 7n. The n-th controllable clock circuit 4n produces a first clock interruption signal CI1 when the n-th controllable clock circuit 4n indicates the predetermined time instant tnp like as in the first embodiment. The first clock interruption signal CI1 is supplied to an n-th processing unit 6an like in the n-th processing unit 6n illustrated in FIG. 2. The n-th processing unit 6an comprises a selection section 602a similar to the selection section 602 illustrated in FIG. 2. Responsive to the first clock interruption signal CI1, the selection section 602a randomly selects a plurality of processors as selected processors from the first through the fifth processors 31 to 35 to produce selected processor numbers PN like those shown in FIG. 2. Responsive to the selected processor numbers PN, a transmission section 603a transmits transmission messages TM to the respective selected processors through the transmission paths 36. Each of the transmission messages TM includes the n-th local time Cn as a transmitted time TT.

The n-th processing unit 6an comprises a reception section 604a which is similar to the reception section 604 shown in FIG. 2. The reception section 604a receives the transmission messages TM through the transmission paths 36 as received messages. The reception section 604 extracts the transmitted times TT from the respective received messages. The transmitted times TT are sent to a control section 605b together with a reception interruption signal RI like that shown in FIG. 2.

Figure 9:
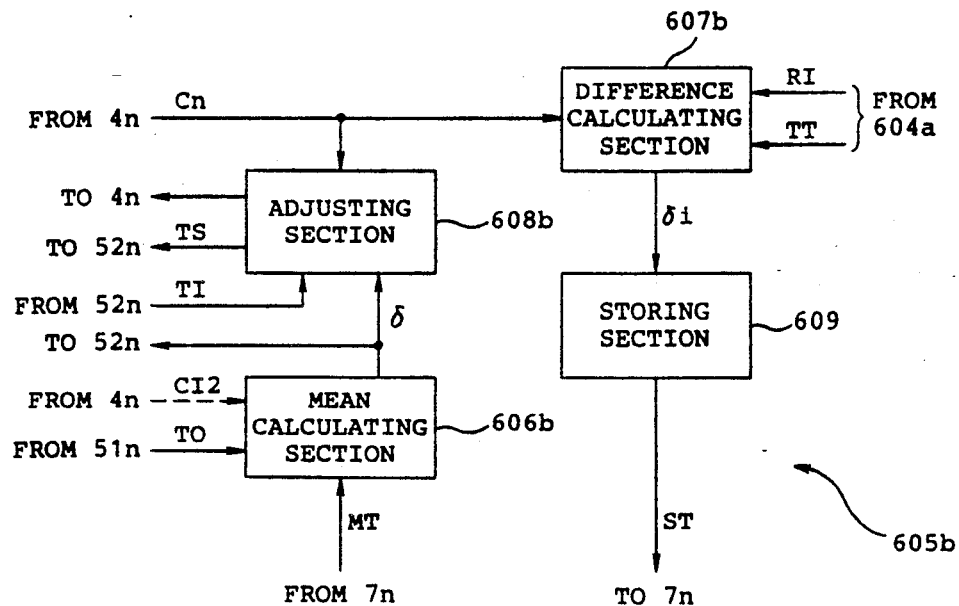
FIG. 9 shows a block diagram of a control section for use in the processor illustrated in FIG. 8.

Referring to FIG. 9, the control section 605b comprises a difference calculating section 607b for subtracting the respective transmitted times TT from the n-th local time Cn to produce the time differences δi upon reception of the reception interruption signal RI. The time differences δi are stored in the n-th local memory 7n (FIG. 8) as the stored times ST by a storing section 609. That is, the n-th local memory 7n memorizes the time differences δi as the memorized times MT.

Turning back to FIG. 8, the first clock interruption signal CI1 is also delivered to an n-th primary timer circuit 51n. The n-th primary timer circuit 51n acts as a measuring arrangement responsive to the first clock interruption signal CI1 for measuring a lapsed time after the predetermined time instant tnp. The n-th primary timer circuit 51n produces a time out signal TO when the lapsed time becomes equal to the predetermined time interval denoted by Tp. The time out signal TO is supplied to the control section 605b. Although the n-th primary timer circuit 51n produces the time out signal TO, the controllable clock circuit 4n may produce a second interruption signal CI2 instead of the time out signal TO when the controllable clock circuit 4n indicates the time instant which is the predetermined time interval Tp after the predetermined time instant tnp.

Referring again to FIG. 9, the control section 605b comprises a mean calculation section 606b responsive to either the time out signal TO or the second interruption signal CI2 for calculating the mean time δ of the memorized times MT. An adjusting section 608b is similar to that illustrated in FIG. 4 and adjusts the n-th controllable clock circuit 4n by using the mean time δ.

Figure 10:
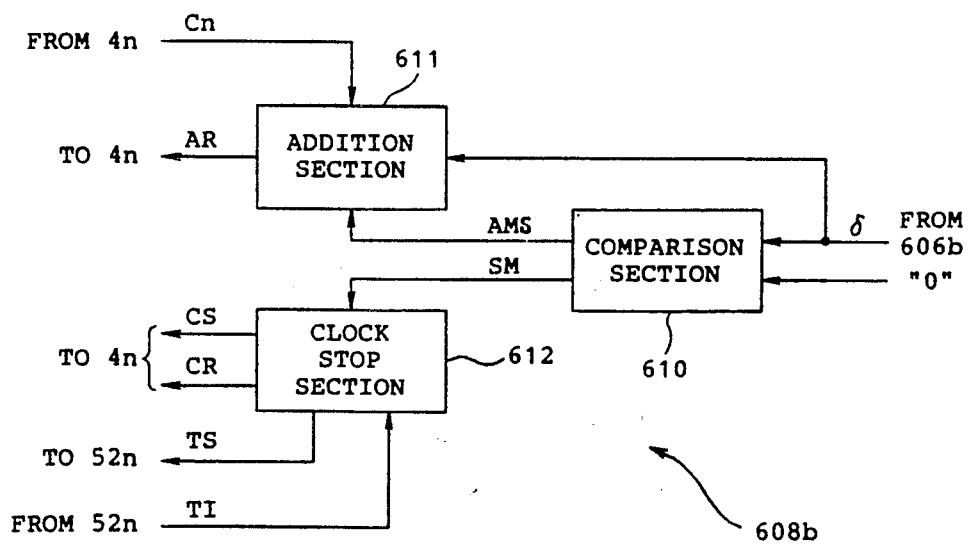
FIG. 10 shows a block diagram of an adjusting section for use in the control section illustrated in FIG. 9.

Referring to FIG. 10, the adjusting section 608b comprises a comparison section 610 for comparing the mean time δ with zero. The comparison section 610 produces an addition mode signal AMS when the mean time δ is less than zero. The comparison section 610 produces a stop mode signal SM when the mean time δ is greater than zero. Responsive to the addition mode signal AMS, an addition section 611 adds an absolute value of the mean time δ to the n-th local time Cn. The addition section 611 delivers an addition result signal AR representative of the result of addition as a new n-th local time to the n-th controllable clock circuit 4n. Responsive to the stop mode signal SM, a clock stop section 612 produces a timer setting signal TS and a clock stop signal CS for making the n-th controllable clock circuit 4n (FIG. 8) stop. Responsive to the clock stop signal CS, the n-th controllable clock circuit 4n stops.

Turning back to FIG. 8, the n-th processor 3n further comprises an n-th secondary timer circuit 52n supplied with the mean time δ and the timer setting signal TS. When the n-th secondary timer circuit 52n receives the timer setting signal TS, the mean time δ is set into the n-th secondary timer circuit 52n. The n-th secondary timer circuit 52n measures a lapsed time after reception of the timer setting signal TS. The n-th secondary timer circuit 52n produces a timer interruption signal TI when the lapsed time becomes equal to the mean time δ.

Referring to FIG. 10 once more, the clock stop section 612 produces, in response to the timer interruption signal TI, a clock restart signal CR for making the n-th controllable clock circuit 4n (FIG. 8) restart. Responsive to the clock restart signal CR, the n-th controllable clock circuit 4n restarts.

Figure 11:
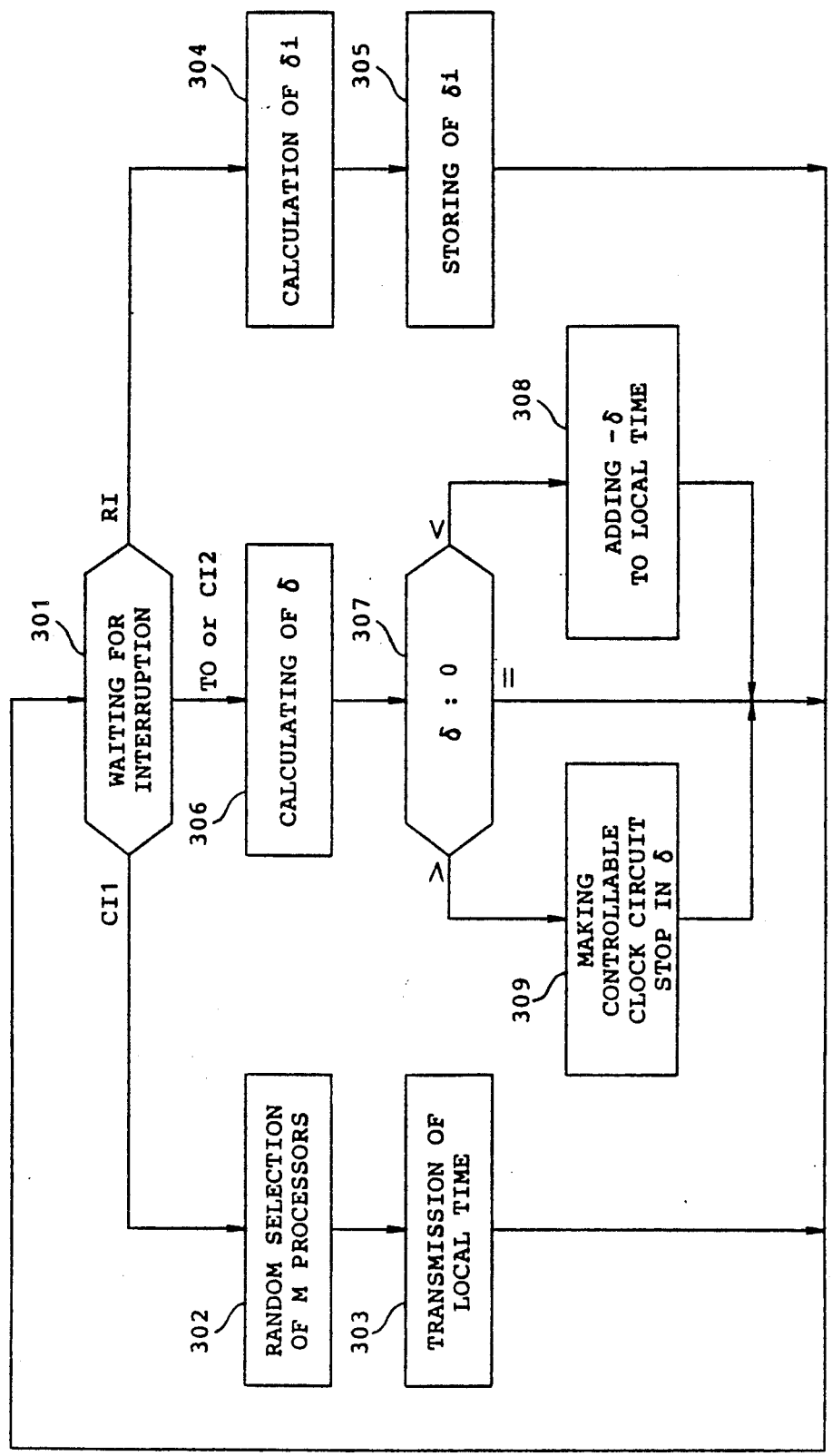
FIG. 11 shows a flow chart for use in describing operation of the loosely coupled distributed system according to the second embodiment.
Figure 12:
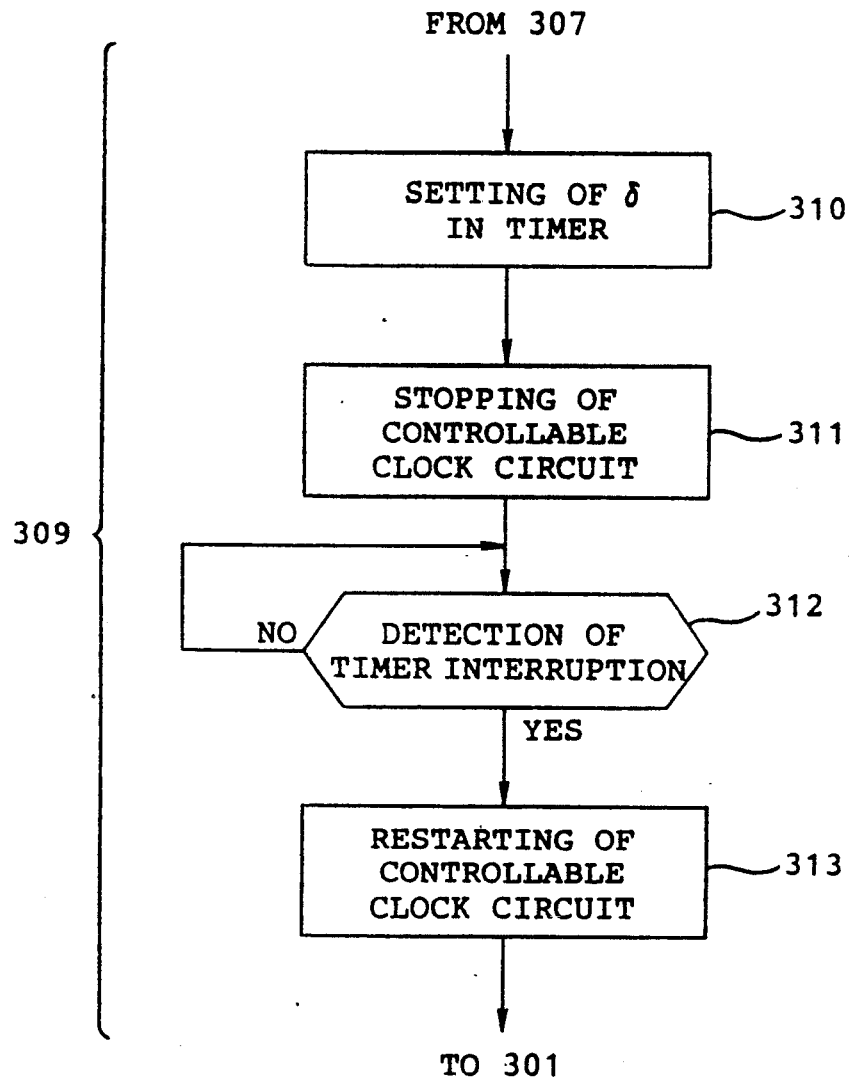
FIG. 12 shows a flow chart for use in specifically describing operation of a part of the flow chart depicted in FIG. 11.

Referring to FIGS. 11 and 12, the description will proceed to operation of the n-th processor 3n of FIG. 8.

When the selection section 602a detects the first clock interruption signal CI1 produced by the n-th controllable clock circuit 4n (CI1 of step 301 of FIG. 11), the selection section 602a randomly selects plurality of processors as the selected processors from the first through the fifth processors 31 to 35 (step 302 in FIG. 11). The selection section 602a delivers the selected processor numbers PN to the transmission section 603a. Responsive to the selected processor numbers PN, the transmission section 603a transmits the transmission messages TM each including the n-th local time Cn to the respective selected processors through the transmission paths 36 (step 303 in FIG. 11). Steps 303 returns to step 301.

Whenever the control section 605b detects the reception interruption signal RI (RI of step 301), the difference calculating section 607b of the control section 605b subtracts the transmitted times TT from the n-th local time Cn to produce the time differences δi (step 304 in FIG. 11). The storing section 609 stores the respective time differences δi as the stored times ST in the n-th local memory 7n (step 305 in FIG. 11). Accordingly, the n-th local memory 7n memorizes the respective time differences δi as the memorized times MT. The step 305 returns to the step 301.

When either the time out signal TO or the second clock interruption signal CI2 is detected by the control section 605b (TO or CI2 of step 301), the mean calculating section 606b of the control section 605b calculates the mean time δ of the memorized times MT (step 306 in FIG. 11). The adjusting section 608b adjusts the n-th controllable clock circuit 4n by using the mean time δ (steps 307 to 309). At first, the comparison section 610 of the adjusting section 608b compares the mean time δ with zero (step 307). When the mean time δ is equal to zero, the step 307 proceeds to the step 301. When the mean time δ is less than zero, the addition section 611 of the adjusting section 608b adds the absolute value of the mean time δ to the n-th local time Cn in response to the addition mode signal AMS (step 308). The addition section 611 delivers the addition result signal AR as the new n-th local time to the n-th controllable clock circuit 4n. When the mean time δ is greater than zero, the clock stop section 612 of the adjusting section 608b makes the n-th controllable clock circuit 4n stop in the mean time δ in response to the stop mode signal SM (step 309). Step 309 is illustrated in FIG. 12 in detail.

In FIG. 12, the mean time δ is set in the n-th secondary timer circuit 52n in response to the timer setting signal TS sent from the clock stop section 612, as shown at step 310. The n-th controllable clock circuit 4n stops in response to the clock stop signal CS, as shown at step 311. Step 311 is followed by step 312 at which the clock stop section 612 judges whether or not the timer interruption signal TI is detected. Responsive to the timer interruption signal TI sent from the n-th secondary timer circuit 52n (YES of step 312), the clock stop section 612 delivers the clock restart signal CR to the n-th controllable clock circuit 4n, as shown step 313. As a result, the n-th controllable clock circuit 4n restarts. Step 313 is followed by step 301.

For a loosely distributed system according to the third embodiment, the n-th processor 3n includes an n-th random variable generator and an n-th local memory (both later illustrated). The n-th random variable generator is for generating a random variable which has a particular one of a plurality of predetermined logic values at a time with a predetermined probability. The predetermined probability may be equal to two-fifths. The n-th processor 3n, at first, selects the random variable as a selected variable whenever the n-th controllable clock circuit indicates repeatedly a first predetermined time instant, and then transmits the n-th local time to the first through the fifth processors 31 to 35 as a transmitted time when the n-th controllable clock circuit indicates a second predetermined time instant and furthermore when the selected variable has the particular one of the predetermined logic values. The second predetermined time instant is a first predetermined time interval after the first predetermined time instant. The n-th processor 3n calculates time differences between the n-th local time and the respective transmitted times whenever the transmitted time is repeatedly received, and then stores the time differences into the n-th local memory as stored times. Namely, the n-th local memory memorizes the time differences as memorized times. The n-th processor 3n calculates a mean time of the memorized times when the n-th controllable clock circuit 4n indicates a third predetermined time instant which is a second predetermined time interval after the first predetermined time instant.

The second predetermined time interval is longer than the first predetermined time interval. The n-th processor 3n adjusts the n-th controllable clock circuit 4n by using the mean time.

Figure 13:
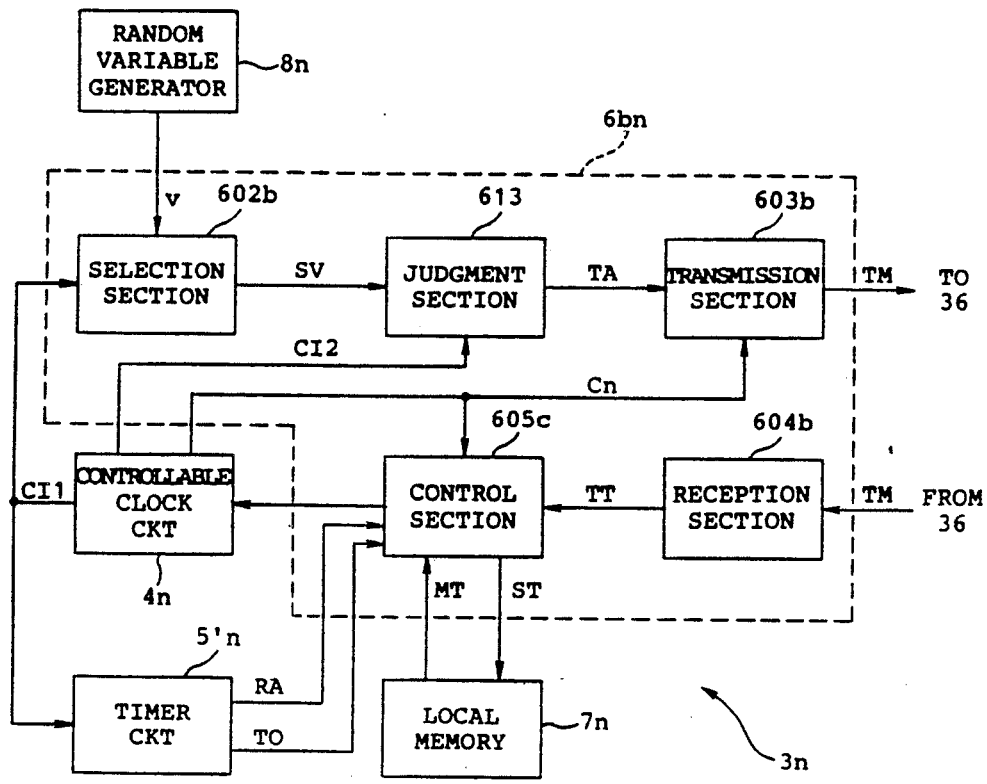
FIG. 13 shows a block diagram of a processor for use in a loosely coupled distributed system according to a third embodiment of this invention.

Referring to FIG. 13, the n-th processor 3n comprises the n-th random variable generator depicted at 8n and the n-th local memory 7n which is similar to that illustrated in FIG. 8. The n-th random variable generator 8n generates a random variable v. The random variable v has one of logic one or zero values at a time. The random variable v has the logic one value with a predetermined probability p. The random variable v has the logic zero value with a probability $(1-p)$. In the illustrated example, the predetermined probability p is equal to two-fifths while the probability $(1-p)$ is equal to three-fifths. The random variable v is supplied to the n-th processing unit 6bn. The n-th controllable clock circuit 4n produces a first clock interruption signal CI1 whenever the n-th controllable clock circuit 4n repeatedly indicates the first predetermined time instant tnp1. The first clock interruption signal CI1 is supplied to the n-th processing unit 6bn and an n-th timer circuit 5'n. The processing unit 6bn comprises a selection section 602b supplied with the random variable v and the first clock interruption signal CI1. The selection section 602b selects the random variable v as the selected variable SV in response to the first clock interruption signal CI1. The selected variable SV is supplied to a judgment section 613. The judgment section 613 is supplied with a second clock interruption signal CI2 sent from the n-th controllable clock circuit 4n. The second clock interruption signal CI2 is produced by the n-th controllable clock circuit 4n at a second predetermined time instant tnp2. The second predetermined time instant tnp2 is a first predetermined time interval Tnp1 after the first predetermined time instant tnp1. The judgement section 613 is for judging whether or not the selected variable SV has the logic one. When the selected variable SV has the logic one, the judgment section 613 produces a transmission allowable signal TA on reception of the second clock interruption signal CI2. Responsive to the transmission allowable signal TA, a transmission section 603b transmits transmission messages TM to the first through the fifth processors 31 to 35 through the transmission paths 36. Each of the transmission messages TM includes the n-th local time Cn as a transmitted time TT.

The n-th processing unit 6bn comprises a reception section 604b for receiving the transmission messages TM through the transmission paths 36 as received messages. The reception section 604b extracts the transmitted times TT from the respective received messages. The transmitted times TT are delivered to a control section 605c coupled to the n-th local memory 7n which is similar to that illustrated in FIG. 8. The n-th timer circuit 5'n acts as a measuring arrangement responsive to the first clock interruption signal CI1 for measuring a lapsed time after the first predetermined time instant tnp1. The n-th timer circuit 5'n produces a time out signal TO when the lapsed time becomes equal to the second predetermined time interval denoted by Tnp2 which is longer than the first predetermined time interval Tnp1. The n-th timer circuit 5'n further produces a reception allowable signal RA during the second predetermined time interval Tnp2 after the first predetermined time instant tnp1. The time out signal TO and the reception allowable signal RA are sent to the control section 605c.

Figure 14:
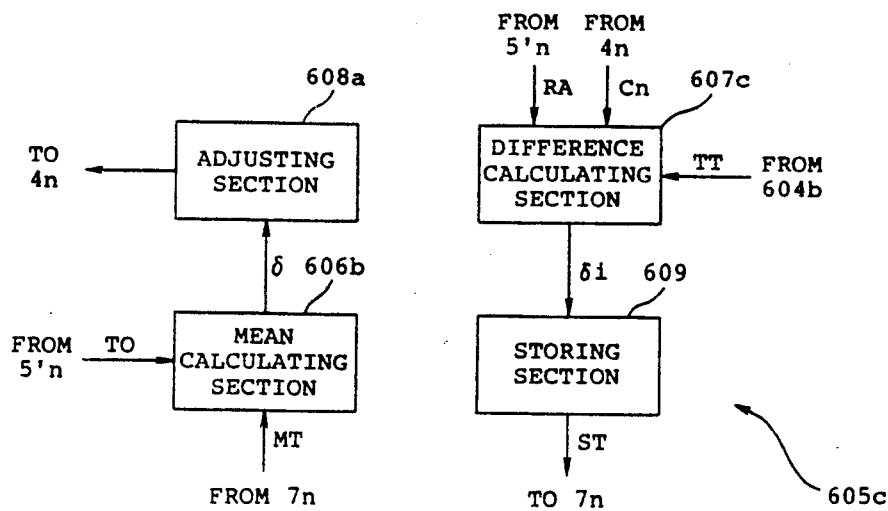
FIG. 14 shows a block diagram of a control section for use in the processor illustrated in FIG. 13.

Referring to FIG. 14, the control section 605c comprises a difference calculating section 607c for subtracting the respective transmitted times TT from the n-th local time Cn to produce the time differences δi during reception of the reception allowable signal RA. The time differences δi are stored in the n-th local memory 7n (FIG. 13) as the stored times ST by the storing section 609. That is, the n-th local memory 7n memorizes the time differences δi as the memorized times MT. Responsive to the time out signal TO, the mean calculating section 606b calculates the mean time δ of the memorized times MT. The adjusting section 608a adjusts the n-th controllable clock circuit 4n by using the mean time δ.

Figure 15:
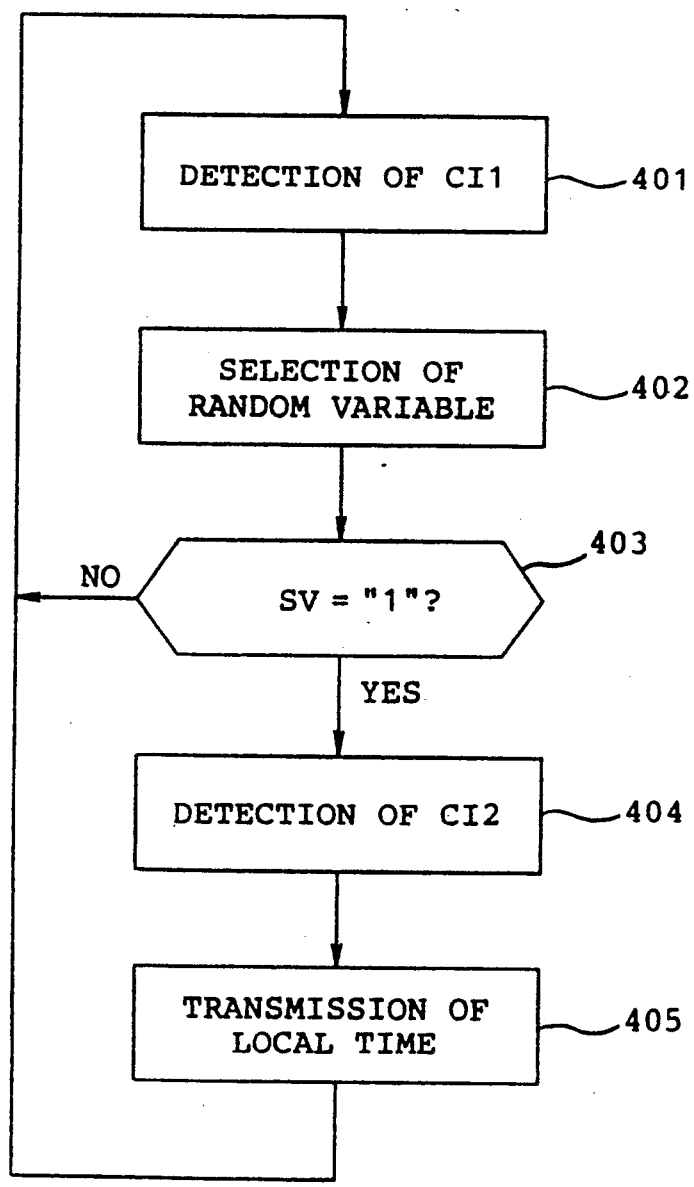
FIG. 15 shows a flow chart for use in describing operation of the loosely coupled distributed system mentioned in connection with FIG. 13.
Figure 16:
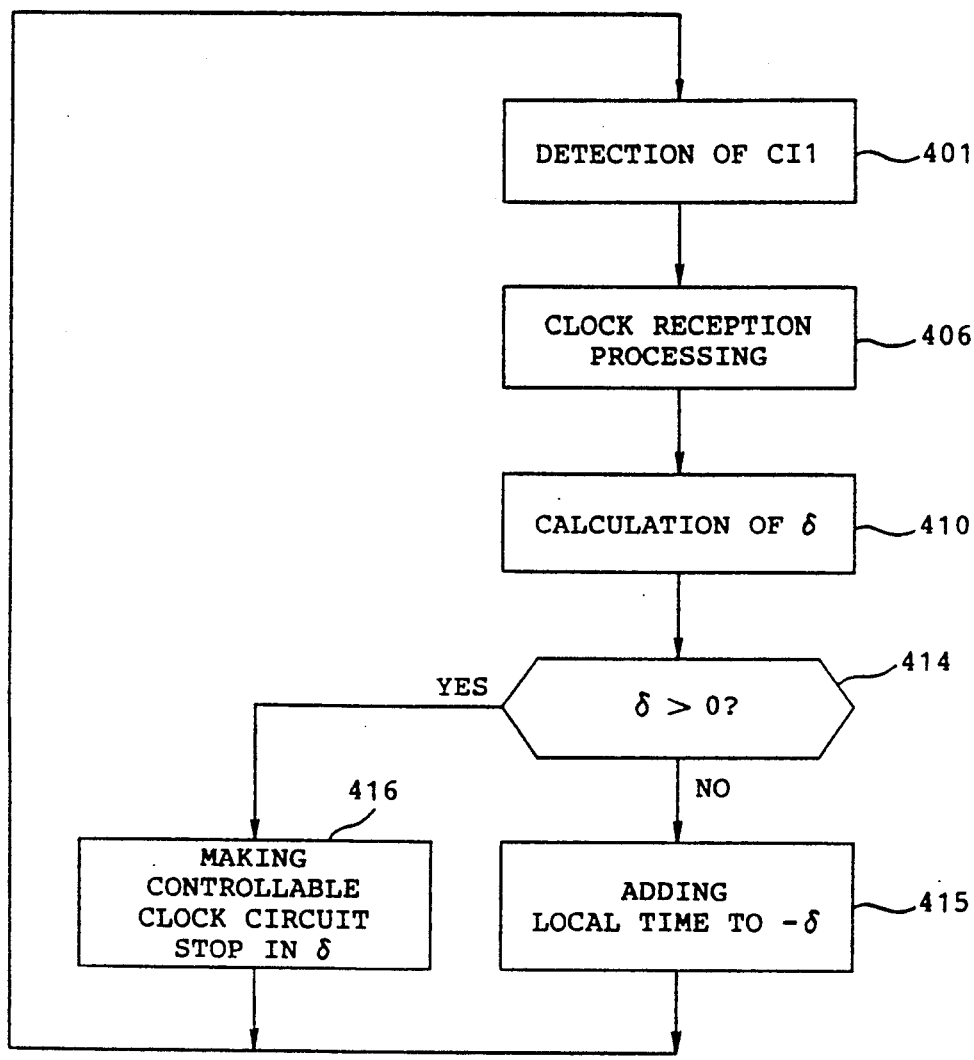
FIG. 16 shows a flow chart for use in describing another operation of the loosely coupled distributed system mentioned in connection with FIG. 13.
Figure 17:
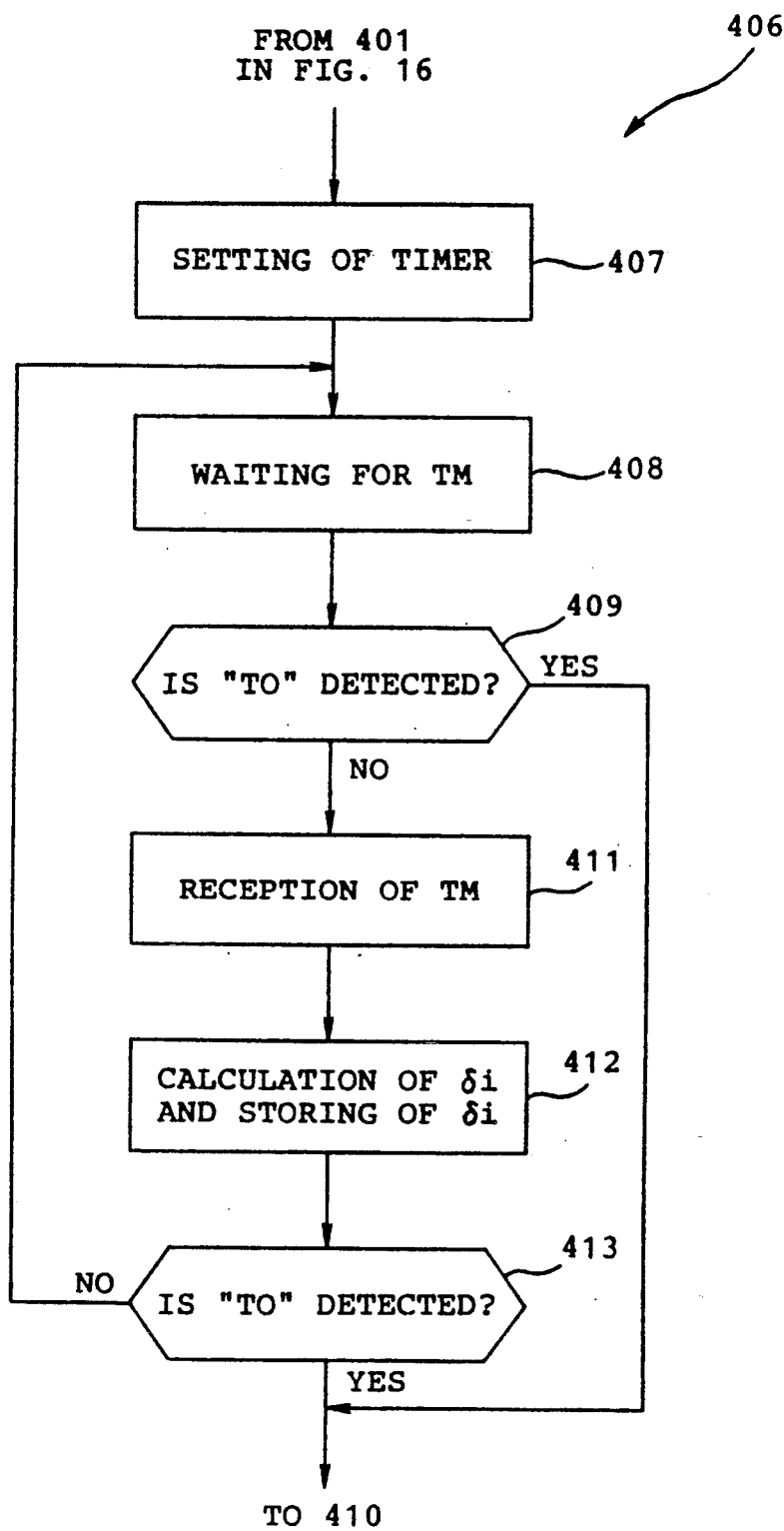
FIG. 17 shows a flow chart for use in specifically describing operation of a part of the flow chart illustrated in FIG. 16.

Referring to FIGS. 15, 16, and 17, the description will proceed to operation of the n-th processor 3n of FIG. 13.

When the selection section 602b detects the first clock interruption signal CI1 (step 401 in FIG. 15), the selection section 602b selects the random variable v as the selected variable SV (step 402 in FIG. 15). The judgment section 613 judges whether or not the selected variable SV has the logic one (step 403 in FIG. 15). When the selected variable SV has the logic zero, step 403 returns to step 401. When the selected variable SV has the logic one, step 403 is followed by step 404. When the second clock interruption signal CI2 is detected at step 404, the transmission section 603b transmits, in response to the transmission allowable signal TA, the transmission messages TM including the n-th local time Cn to the first through the fifth processors 31 to 35 through the transmission paths 36 (step 405 in FIG. 15).

In FIG. 16, the control section 605b carries out a clock reception processing at step 406, in the manner which will presently be described, when the first clock interruption signal CI1 is detected by the n-th timer circuit 5'n at step 401.

In FIG. 17, step 406 will now be described in detail. The n-th timer circuit 5'n measures, in response to the first clock interruption signal CI1, the lapsed time after the predetermined time instant tnp1 at step 407. Step 407 is followed by step 408 at which the reception section 604b waits for the transmission messages TM. When the time out signal TO is detected by the control section 605c at step 409, step 409 proceeds to step 410 (FIG. 16). When the time out signal TO is not detected by the control section 605c at step 409, step 409 proceeds to step 411 at which the reception section 604b receives the transmission messages TM through the transmission paths 36. Step 411 is followed by step 412 at which the difference calculating section 607c calculates the time differences δi between the n-th local time Cn and the respective transmitted times TT sent from the reception section 604b, and then the storing section 609 stores the time differences δi in the n-th local memory 7n as the stored times ST. Accordingly, the time differences δi are memorized in the n-th local memory 7n as the memorized times MT. Step 412 proceeds to step 413 at which the control section 605c judges whether or not the time out signal TO is detected by the control section 605c. When the time out signal TO is not detected by the control section 605c, step 413 is followed by step 408. When the time out signal TO is detected by the control section 605c, step 413 is followed by step 410.

Turning back to FIG. 16, the mean calculating section 606b calculates the mean time δ of the memorized times MT in response to the time out signal TO at step 410. The adjusting section 608a adjusts the n-th controllable clock circuit 4n by using the mean time δ, as shown at steps 414 to 416. At first, the adjusting section 608a judges whether or not the mean time δ is positive at step 414. When the mean time δ is negative, the adjusting section 608a adjusts the n-th controllable clock circuit 4n by adding the n-th local time Cn to an absolute value of the mean time δ at step 415. When the mean time δ is positive, the adjusting section 608a adjusts the n-th controllable clock circuit 4n by making the n-th controllable clock circuit 4n stop in the mean time δ at step 416.

Figure 18:
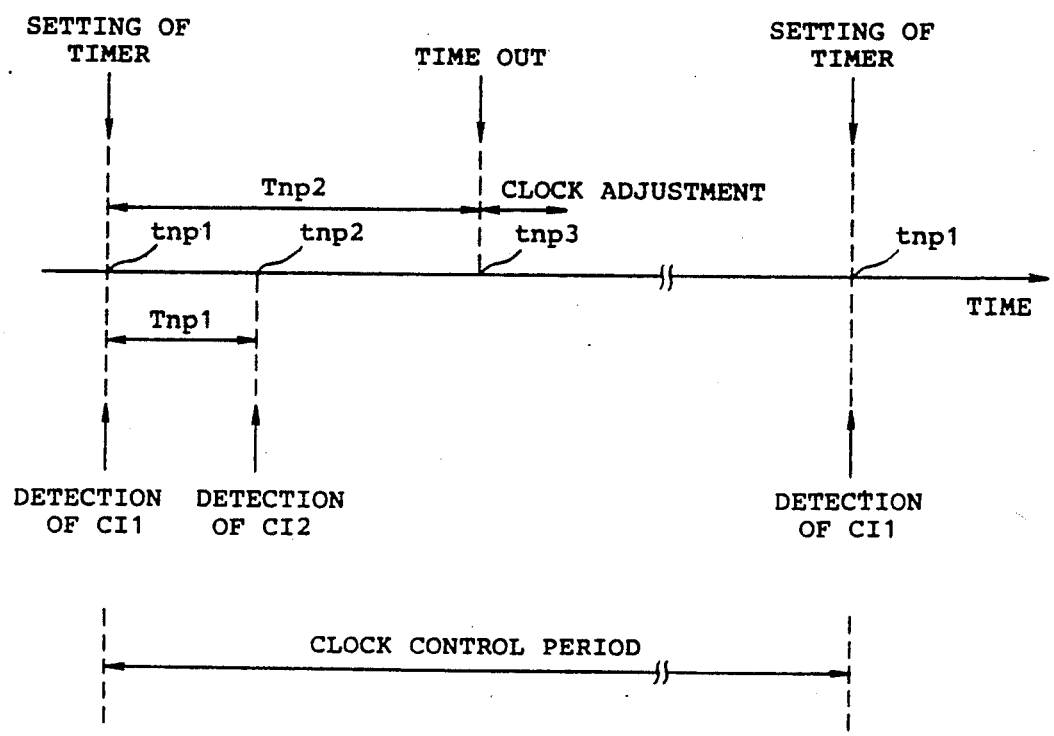
FIG. 18 shows a time chart for use in describing operation of the loosely coupled distributed system mentioned in connection with FIG. 13.

Referring to FIG. 18, the n-th processor 3n (FIG. 13) carries out clock synchronization with a clock control period between the first predetermined time instants tnp1. Clock adjustment is made by using the transmitted times TT which are received during the second predetermined time interval Tnp2 at the third predetermined time instant denoted by tnp3. In FIG. 18, clock reception timing is depicted above the time axis while clock transmission timing is depicted below the time axis.

What is claimed is:

1. In a distributed system comprising first through N-th processors connected together, where N represents a first predetermined natural number which is not less than three, said first through N-th processors including first through N-th controllable clock circuits, respectively, and an n-th processor including an n-th controllable clock circuit indicating an n-th local time instant, where n represents each of 1 through N, a method of synchronizing said first through N-th controllable clock circuits comprising the steps of:

setting in an n-th timer circuit of said n-th processor an adjusting time interval which is randomly selected from a predetermined time interval, when said n-th controllable clock circuit indicates a predetermined time instant;

randomly selecting a plurality of processors as selected processors from said first through N-th processors when said n-th time circuit indicates that said adjusting time interval has lapsed, where said selected processors are equal in number to a second predetermined natural number which is not less than two but is less than said first predetermined natural number;

reading, as readout time instants, said local time instants indicated by said controllable clock circuits of each of the respective said selected processors;

calculating an average time instant of said readout time instants;

calculating a time difference between said n-th local time instant and said average time instant; and adjusting said n-th controllable clock circuit by using said time difference.

2. In a distributed system comprising first through N-th processors connected together, where N represents a first predetermined natural number which is not less than three, said first through N-th processors including first through N-th controllable clock circuits, respectively, and an n-th processor including an n-th controllable clock circuit indicating an n-th local time instant, where n represents each of 1 through N, a method of synchronizing said first through N-th controllable clock circuits comprising the steps of:

setting in an n-th timer circuit of said n-th processor an adjusting time interval which is randomly selected from a predetermined time interval, when said n-th controllable clock circuit indicates a predetermined time instant;

randomly selecting a plurality of processors as selected processors from said first through N-th processors when said n-th timer circuit indicates that said adjusting time interval has lapsed, where said selected processors are equal in number to a second predetermined natural number which is not less than two but is less than said first predetermined natural number;

reading, as readout time instants, said local time instants indicated by said controllable clock circuits of each of the respective said selected processors;

calculating a plurality of time differences between said n-th local time instant and each of said readout time instants;

calculating a mean time of said plurality of time differences; and adjusting said n-th controllable clock circuit by using said mean time.

3. In a distributed system comprising first through N-th processors connected together, where N represents a first predetermined natural number which is not less than three, said first through N-th processors including first through N-th controllable clock circuits, respectively, and an n-th processor including an n-th controllable clock circuit indicating an n-th local time instant, where n represents each of 1 through N, a method of synchronizing said first through N-th controllable clock circuits comprising the steps of:

randomly selecting a plurality of processors as selected processors from said first through said N-th processors when said n-th controllable clock circuit indicates a predetermined time instant, said selected processors being equal in number to a second predetermined natural number which is not less than two but is less than said first predetermined natural number;

transmitting said n-th local time instant to said selected processors as a transmitted time instant;

calculating a plurality of time differences between said n-th local time instant and each of the respective said transmitted time instants, when said transmitted time instant is received;

memorizing said time differences as memorized times;

calculating a mean time of said memorized times when said n-th controllable clock circuit indicates a time instant which is a predetermined time interval after said predetermined time instant; and adjusting said n-th controllable clock circuit by using said mean time.

4. In a distributed system comprising first through N-th processors connected together, where N represents a first predetermined natural number which is not less than three, said first through N-th processors including first through N-th controllable clock circuits, respectively, and an n-th processor including an n-th controllable clock circuit indicating an n-th local time instant, where n represents each of 1 through N, a method of synchronizing said first through N-th controllable clock circuits comprising the steps of:

generating a random number which has one of a plurality of predetermined logic values;

selecting said random number as a selected number when said n-th controllable clock circuit indicates a first predetermined time instant;

transmitting said n-th local time instant to said first through N-th processors as a transmitted time instant when said n-th controllable clock circuit indicates a second predetermined time instant, said second predetermined time instant being a first predetermined time interval after said first predetermined time instant and said selected number equals a particular one of said predetermined logic values;

calculating a plurality of time differences between said n-th local time instant and each of the respective said transmitted time instants, when said transmitted time instant is received;

memorizing said time differences as memorized times;

calculating a mean time of said memorized times when said n-th controllable clock circuit indicates a third predetermined time instant which is a second predetermined time interval after said first predetermined time instant, said second predetermined time interval being longer than said first predetermined time interval; and adjusting said n-th controllable clock circuit by using said mean time.

5. In a distributed system comprising first through N-th processors connected together, where N represents a first predetermined natural number which is not less than three, said first through N-th processors including first through N-th controllable clock circuits, respectively, and an n-th processor including an n-th controllable clock circuit indicating an n-th local time instant, where n represents each of 1 through N, the improvement wherein said n-th processor comprises:

generating means for generating adjusting time interval which is randomly selected from a predetermined time interval when said n-th controllable clock circuit indicates a predetermined time instant;

measuring means responsive to said adjusting time interval for measuring a lapsed time after said predetermined time instant, said measuring means producing a time out signal when said lapsed time is equal to said adjusting time interval;

selecting means responsive to said time out signal for randomly selecting a plurality of processors as selected processors from said first through N-th processors, said selected processors being equal in number to a second predetermined natural number which is not less than two but which is less than said first predetermined natural number;

reading means for reading, as readout time instants, a plurality of local time instants, each said local time instant indicated by a controllable clock circuit of the respective said selected processors;

average calculating means for calculating an average time instant of said readout time instants;

difference calculating means for calculating a time difference between said n-th local time instant and said average time instant; and adjusting means for adjusting said n-th controllable clock circuit by using said time difference.

6. In a distributed system comprising first through N-th processors connected together, where N represents a first predetermined natural number which is not less than three, said first through N-th processors including first through N-th controllable clock circuits, respectively, and an n-th processor including an n-th controllable clock circuit indicating an n-th local time instant, where n represents each of 1 through N, the improvement wherein said n-th processor comprises:

generating means for generating an adjusting time interval which is randomly selected from a predetermined time interval when said n-th controllable clock circuit indicates a predetermined time instant;

measuring means responsive to said adjusting time interval for measuring a lapsed time after said predetermined time instant, said measuring means producing a time out signal when said lapsed time is equal to said adjusting time interval;

selecting means responsive to said time out signal for randomly selecting a plurality of processors as selected processors from said first through N-th processors, said selected processors being equal in number to a second predetermined natural number which is not less than two but which is less than said first predetermined natural number;

reading means for reading, as readout time instants, a plurality of local time instants, each said local time instant indicated by a controllable clock circuit of the respective said selected processors;

difference calculating means for calculating a plurality of time differences between said n-th local time instant and said readout time instants;

mean calculating means for calculating a mean time of said time differences; and adjusting means for adjusting said n-th controllable clock circuit by using said mean time.

7. In a distributed system comprising first through N-th processors connected together, where N represents a first predetermined natural number which is not less than three, said first through N-th processors including first through N-th controllable clock circuits, respectively, and an n-th processor including an n-th controllable clock circuit indicating an n-th local time instant, where n represents each of 1 through N, the improvement wherein said n-th processor comprises:

selecting means for randomly selecting a plurality of processors as selected processors from said first through N-th processors when said n-th controllable clock circuits indicate a predetermined time instant, said selected processors being equal in number to a second predetermined natural number which is not less than two but is less than said first predetermined natural number;

transmitting means for transmitting said n-th local time instant to said selected processors as a transmitted time instant;

difference calculating means for calculating a plurality of time differences between said n-th local time instant and each of the respective said transmitted time instants, when said transmitted time instant is received;

memorizing means for memorizing said time differences as memorized times;

measuring means for measuring a lapsed time after said predetermined time instant, said measuring means producing a time out signal when said lapsed time is equal to a predetermined time interval;

mean calculating means responsive to said time out signal for calculating a mean time of said memorized times; and adjusting means for adjusting said n-th controllable clock circuit by using said mean time.

8. In a distributed system comprising first through N-th processors connected together where N represents a first predetermined natural number which is not less than three, said first through N-th processors including first through N-th controllable clock circuits, respectively, and an n-th processor including an n-th controllable clock circuit indicating an n-th local time instant, where n represents each of 1 through N, the improvement wherein said n-th processors comprises:

generating means for generating a random number which has one of a plurality of predetermined logic values;

selecting means for selecting said random number as a selected number when said n-th controllable clock circuit indicates a first predetermined time instant;

transmitting means for transmitting said n-th local time instant to said first through N-th selected processors as a transmitted time instant when said n-th controllable clock circuit indicates a second predetermined time instant, said second predetermined time instant being a first predetermined time interval after said first predetermined time instant, and said selected number equals a particular one of said predetermined logic values;

difference calculating means for calculating a plurality of time differences between said n-th local time instant and each of the respective said transmitted time instants, when said transmitted time instant is received;

memorizing means for memorizing said time differences as memorized times;

measuring means for measuring a lapsed time after said first predetermined time instant, said measuring means producing a time out signal when said lapsed time is equal to a second predetermined time interval which is longer than said first predetermined time interval;

means calculating means responsive to said time out signal for calculating a mean time of said memorized times; and adjusting means for adjusting said n-th controllable clock circuit by using said mean time.

* * * * *